United States Patent
Fischer et al.

(10) Patent No.: US 9,689,188 B2
(45) Date of Patent: Jun. 27, 2017

(54) SPINDLE DRIVE FOR AN ADJUSTMENT ELEMENT OF A MOTOR VEHICLE

(71) Applicant: Brose Fahrzeugteile GmbH & Co. KG, Hallstadt, Hallstadt (DE)

(72) Inventors: Uwe Fischer, Sonneberg (DE); Christian Saxstetter, Doerfles-Esbach (DE); Robert Neundorf, Ebersdorf (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/431,059

(22) PCT Filed: Aug. 30, 2013

(86) PCT No.: PCT/EP2013/068018
§ 371 (c)(1),
(2) Date: Mar. 25, 2015

(87) PCT Pub. No.: WO2014/048679
PCT Pub. Date: Apr. 3, 2014

(65) Prior Publication Data
US 2015/0240547 A1 Aug. 27, 2015

(30) Foreign Application Priority Data
Sep. 25, 2012 (DE) .................. 10 2012 018 826

(51) Int. Cl.
*F16H 25/20* (2006.01)
*E05F 15/622* (2015.01)
*F16H 25/24* (2006.01)

(52) U.S. Cl.
CPC ........... *E05F 15/622* (2015.01); *F16H 25/20* (2013.01); *F16H 25/2418* (2013.01);
(Continued)

(58) Field of Classification Search
CPC ............ E05F 15/622; E05Y 2900/546; F16H 2025/2031; F16H 2025/2075; F16H 25/20;
(Continued)

(56) References Cited

U.S. PATENT DOCUMENTS 3,751,998 A 8/1973 Vasilatos et al.
4,560,894 A 12/1985 Stoll et al.
(Continued)

FOREIGN PATENT DOCUMENTS

DE 8428487 12/1985
DE 202005000559 1/2006
(Continued)

OTHER PUBLICATIONS

International Search Report & Written Opinion for PCT/EP2012/005011, mailed Jan. 3, 2014 (English Translation from WIPO) (11 pages).
(Continued)

*Primary Examiner* — Bobby Rushing, Jr.
(74) *Attorney, Agent, or Firm* — Pauly, Devries Smith & Deffner, LLC

(57) ABSTRACT

A spindle drive for an adjustment element of a motor vehicle is provided. The spindle drive has a drive unit and a spindle-spindle nut transmission arranged downstream of the drive unit in terms of drive for generating linear drive movements. The drive unit has a tubular drive unit housing and therein a drive motor. In some cases an intermediate transmission is arranged downstream of the drive motor in terms of drive. The drive unit and the spindle-spindle nut transmission are arranged one behind the other on the geometrical spindle axis, and a spindle drive housing is provided with a tubular inner housing and a tubular outer housing. The inner housing runs in a telescope-like manner
(Continued)

in the outer housing. In some cases the outer housing of the spindle drive housing accommodates the drive unit with the drive unit housing and is connected to the drive unit.

17 Claims, 4 Drawing Sheets

(52) U.S. Cl.
 CPC . *E05Y 2900/546* (2013.01); *F16H 2025/2031* (2013.01); *F16H 2025/2075* (2013.01); *Y10T 74/18576* (2015.01); *Y10T 74/18712* (2015.01)

(58) Field of Classification Search
 CPC ... F16H 25/2418; F16F 9/3235; F16F 9/3257; F16F 9/43; B60J 5/107
 USPC ................ 74/89.23, 89.4, 89.3, 127, 424.71; 188/315, 322.19, 322.21
 See application file for complete search history.

(56) References Cited

U.S. PATENT DOCUMENTS

| | | | |
|---|---|---|---|
| 5,041,748 | A | 8/1991 | Huber et al. |
| 6,516,567 | B1 | 2/2003 | Garcia et al. |
| 7,665,794 | B2 | 2/2010 | Kachouh |
| 8,156,838 | B2 | 4/2012 | Batosky et al. |
| 9,103,373 | B1 | 8/2015 | Kolar et al. |
| 9,260,899 | B2 | 2/2016 | Loeffler et al. |
| 2007/0062119 | A1 | 3/2007 | Ritter |
| 2010/0192715 | A1 | 8/2010 | Vauchel et al. |
| 2010/0230907 | A1 | 9/2010 | Hatano et al. |
| 2011/0290050 | A1 | 12/2011 | Kummer et al. |
| 2013/0024076 | A1 | 1/2013 | Fukui et al. |
| 2014/0366662 | A1* | 12/2014 | Fischer .................. F16H 25/20 74/89.23 |

FOREIGN PATENT DOCUMENTS

| | | | |
|---|---|---|---|
| DE | 202005003466 | 8/2006 | |
| DE | 102005030052 | 12/2006 | |
| DE | 102008061118 | 6/2010 | |
| DE | 102008061120 | 6/2010 | |
| DE | 102008062391 | 6/2010 | |
| DE | 102008062391 A1 * | 6/2010 | ............. F16H 25/20 |
| DE | 102008062400 | 6/2010 | |
| DE | 102011122316 | 6/2013 | |
| DE | 102011122316 A1 * | 6/2013 | ............. F16H 25/20 |
| EP | 2199513 | 6/2010 | |
| EP | 2284345 | 2/2011 | |
| JP | 2007331699 | 12/2007 | |
| JP | 2009247109 | 10/2009 | |
| KR | 1020110118774 | 11/2011 | |
| WO | 2013091779 | 6/2013 | |

OTHER PUBLICATIONS

Search Report for German Patent Application No. 1020111223162, mailed Jan. 26, 2012 (4 pages).
International Search Report for PCT/EP2013/068018, mailed May 2, 2014 (6 pages).
Search Report for German Patent Application No. 102012018826.9, mailed Nov. 27, 2013 (5 pages).
Non-Final Office Action for U.S. Appl. No. 14/638,189, mailed May 6, 2016 (14 pages).
Office Action for Korean Patent Application No. 10-2015-7010717, mailed Jul. 14, 2016 (4 pages), English translation.
Final Office Action for U.S. Appl. No. 14/368,189, mailed Feb. 6, 2017 (16 pages).

* cited by examiner

SPINDLE DRIVE FOR AN ADJUSTMENT ELEMENT OF A MOTOR VEHICLE

FIELD OF THE TECHNOLOGY

The present invention relates to a spindle drive for an adjustment element of a motor vehicle, and to a flap arrangement for a motor vehicle including a spindle drive.

The term "adjustment element" is to be understood broadly in the present case. It comprises, for example, a tailgate, a trunk lid, an engine hood, a side door, a trunk lid, an elevating roof or the like of a motor vehicle. The focus below is on the field of application of motoric adjustment of a tailgate of a motor vehicle. This is not to be understood to be restrictive.

BACKGROUND

Spindle drives are being increasingly used in the course of motoric actuation of tailgates or the like. The known spindle drive (DE 10 2008 062 400 A1), from which the invention proceeds, is equipped with a drive unit and a spindle-spindle nut transmission arranged downstream of the drive unit in terms of drive for generating linear drive movements. The drive unit has a tubular, one-piece drive unit housing which accommodates a drive motor and an intermediate transmission arranged downstream of the drive motor in terms of drive.

The spindle drive housing of the known spindle drive is constructed in a telescope-like manner with a tubular inner housing and a tubular outer housing, wherein the tubular inner housing is provided by the tubular drive unit housing. This dual use of the drive unit housing does indeed lead to a compact structure, but brings with it structural restrictions. Such a structural restriction lies, for example, in the fact that the drive housing must be configured fundamentally in terms of the absorption of drive forces, while the spindle drive housing can be located at least partially outside the flow of force of the drive force. A configuration which is tailored to the respective loading situation is possible with the known spindle drive only with a relatively high degree of constructive outlay.

SUMMARY

The problem on which the invention is based is to configure and further develop the known spindle drive in such a manner that a more flexible configuration of the spindle drive tailored to the respective application is possible.

The above problem is solved in the case of a spindle drive as described herein.

It is substantial that the outer housing of the spindle drive housing accommodates the drive unit and is connected to the drive unit housing. The spindle drive housing on one hand and the drive unit housing on the other can thus be configured largely independently of one another in a targeted manner to the loads to be expected in each case. Moreover, the visual impression of the outer housing can be advantageously influenced with little outlay since this visual impression is, in the case of a suitable configuration, only determined by the outer housing and not by the drive unit housing.

Some configurations show that a particularly short configuration of the spindle drive along the geometrical spindle axis is possible with the solution according to the proposal. It is substantial in this case that the inner housing, in the fully retracted state, overlaps with the drive unit. In this state, an end portion of the inner housing is located between the drive unit housing and the outer housing which leads to optimum installation space utilization.

Some implementations relate to realizations of an anti-rotation lock between the mechanical connections of the spindle drive. In one alternative, which goes back to a positive lock between the guide tube and a torque tube, neither the outer housing nor the inner housing are involved in the absorption of torques. A comparatively weak and thus low-cost configuration of the spindle drive housing in general, in particular from a plastic material or the like, is thus easily possible.

In one configuration, a drainage gap is always provided between the drive unit housing and the outer housing via a spacer arrangement so that an outward flow of fluid present in the spindle drive housing, such as condensation water, is possible.

In order to ensure that the spindle drive, in any event in the fully restricted state, has a certain density, the inner housing is equipped at its end portion distant from the drive unit with a covering cap which, in the case of an adjustment of the spindle drive into the fully retracted state, is in sealing engagement with the end portion, which is distant from the drive unit, of the outer housing. A sliding seal, which is thus prone to wear, between the outer housing and the inner housing can thus in principle be omitted.

A spindle drive with an above covering cap is the subject matter of a further implementation having independent significance.

In this implementation, the spindle drive corresponds in principle to the structure of the spindle drive according to the former teaching, wherein the key feature is not, however, the realization of a drive unit housing. The realization of the abovementioned covering cap, which, in the fully retracted state, as mentioned above is in sealing engagement with the outer housing, is substantial. In this regard, reference can be made to all the statements in relation to the former teaching.

According to a further teaching, which also has independent significance, a flap arrangement for a motor vehicle is provided.

The flap arrangement according to the proposal is equipped with a flap, in particular with a tailgate, and with at least one of the spindle drives proposed above. In this regard too, reference can be made to all the statements in relation to the two former teachings.

Some implementations relate to different installation situations for the spindle drive. In the case of one configuration, the end portion, which is distant from the drive unit, of the inner housing lies at the top so that a covering cap, already explained, is advantageously provided which can be brought into sealing engagement with the outer housing.

In the case of another configuration, the end portion, which is distant from the drive unit, of the inner housing lies at the bottom so that a covering cap is realized there which only provides at least one drainage recess for drainage of the inner housing.

Different installation situations which place completely different demands on the sealing system can thus be realized with the above provision of a covering cap.

One aspect of embodiments of the invention relates to a spindle drive for an adjustment element of a motor vehicle. The spindle drive includes a drive unit and a spindle-spindle nut transmission arranged downstream of the drive unit in terms of drive for generating linear drive movements. The drive unit has a tubular drive unit housing and therein a drive motor. In some cases the tubular drive unit housing is optionally a one-piece drive unit housing. In applicable cases, an intermediate transmission is arranged downstream of the drive motor in terms of drive. The drive unit and the spindle-spindle nut transmission are arranged one behind the other on the geometrical spindle axis and a spindle drive housing is provided with a tubular inner housing and a tubular outer housing, wherein the inner housing runs in a telescope-like manner in the outer housing. The outer housing of the spindle drive housing accommodates the drive unit with the drive unit housing and is connected to the drive unit.

In some implementations, an axial extension of the drive unit housing is at least the axial extension of the drive motor (optionally together with the intermediate transmission when applicable) and is smaller than 150% of the axial extension of the drive motor (together with the intermediate transmission if applicable).

In some cases the outer housing is primarily composed of a first material and the drive unit housing is primarily composed of a second material. The second material is harder than the first material, and/or the second material is less flexible than the first material, and/or the second material has a higher toughness than the first material, and/or the first material is a plastic material and that the second material is a metallic material. In some cases the metallic material is steel.

In some implementations the inner housing and/or the outer housing always lie outside the flow of force of the drive force. In other words, one or both of the inner and outer housings lie outside the flow of the drive force. In one configuration, the inner housing overlaps with an axial overlapping portion of the drive unit in a fully retracted state. Optionally, the inner housing does not overlap with the drive unit in a fully extended state. In another configuration, the drive unit housing has a reduced diameter in the region of the overlapping portion in comparison with the rest of the drive unit housing. The intermediate transmission may be optionally arranged in the overlapping portion.

According to some implementations, a spindle drive has two connections for transferring the linear drive movements. In some cases the connections are provided on the geometrical spindle axis. A first connection is connected to the drive unit and a second connection is connected via a guide tube to the spindle nut. In some cases, an anti-rotation lock is provided between the two connections by a positive lock between the spindle nut, or the guide tube, and a torque tube fixed on the drive unit. In some cases the anti-rotation lock is provided by a positive lock between inner housing and outer housing. Some implementations provide an axial connecting portion of the drive unit housing in engagement with the outer housing via a spacer arrangement which generates a radial drainage gap between the connecting portion and the outer housing. In some cases the spacer arrangement is formed from at least one web. The at least one web optionally runs substantially axially, and the at least one web can be arranged on the connecting portion of the drive unit housing.

In some cases the inner housing has, on an end portion distant from the drive unit, a covering cap. The covering cap, in the fully retracted state, is in sealing engagement with the end portion of the outer housing that is distant from the drive unit. In the extended state, the covering cap is not in engagement with the end portion of the outer housing that is distant from the drive unit. In some cases the covering cap provides at least one drainage recess for drainage of the inner housing.

According to another aspect of the disclosure, a spindle drive for an adjustment element of a motor vehicle is provided. The spindle drive includes a drive unit and a spindle-spindle nut transmission arranged downstream of the drive unit in terms of drive for generating linear drive movements. A tubular spindle drive housing is provided with an inner housing and an outer housing. The inner housing runs in a telescope-like manner in the outer housing, and the inner housing has a covering cap at its end portion distant from the drive unit. The covering cap is, in the fully retracted state, in sealing engagement with an end portion, which is distant from the drive unit, of the outer housing. In an extended state, the covering cap is not in engagement with the end portion, which is distant from the drive unit, of the outer housing.

In some implementations according to this aspect, the features described above regarding the first aspect can also be implemented for this aspect.

According to another aspect, a flap arrangement for a motor vehicle is provided with a flap and with at least one spindle drive for motoric adjustment of the flap as discussed in any of the examples above. In one flap arrangement, the inner housing has, on its end portion distant from the drive unit, a covering cap which lies, in the case of a fully retracted spindle drive and closed flap, in the upper region of the spindle drive. The covering cap is then in sealing engagement with the end portion, which is distant from the drive unit, of the outer housing. In some implementations the inner housing has, on its end portion distant from the drive unit, a covering cap which lies, in the case of a fully retracted spindle drive and closed flap, in the lower region of the spindle drive. The covering cap can provide at least one drainage recess for drainage of the inner housing.

BRIEF DESCRIPTION OF THE DRAWINGS

The invention will be explained in greater detail below on the basis of a drawing which represents only one exemplary embodiment. In the drawing

DETAILED DESCRIPTION

Figure 1:
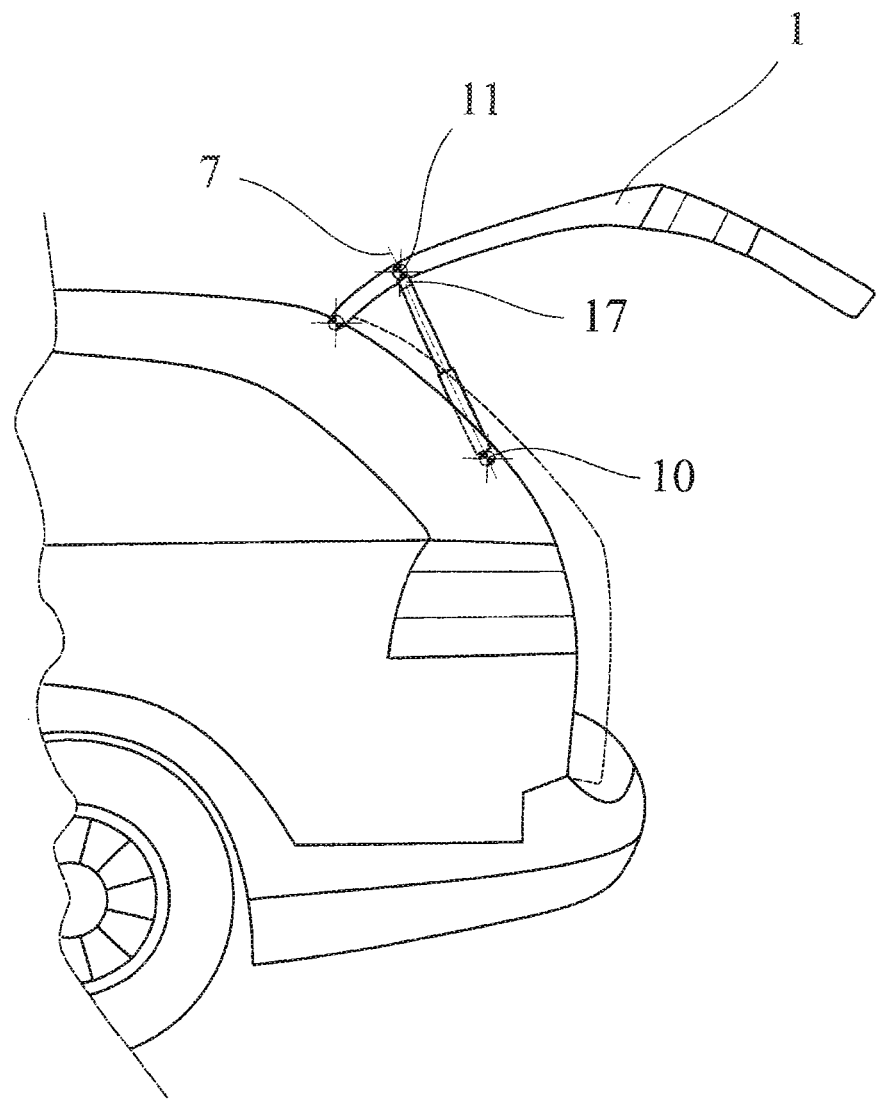
FIG. 1 shows, in a schematic side view, the rear end of a motor vehicle with a spindle drive according to the proposal.

Referring to FIGS. 1-4, the spindle drive represented in the drawings serves the purpose of motoric adjustment of an adjustment element 1, configured as a tailgate, of a motor vehicle. Other fields of application of the spindle drive according to the proposal are conceivable, as is explained in detail further below.

The spindle drive is equipped in a conventional manner with a drive unit 2 and a spindle-spindle nut transmission 3 arranged downstream of drive unit 2 in terms of drive for generating linear drive movements. In this case, drive unit 2 has an optionally tubular and one-piece drive unit housing 4 and therein a drive motor 5 and an intermediate transmission 6 arranged downstream of drive motor 5 in terms of drive. Depending on the configuration of drive motor 5, an intermediate transmission 6 can also be omitted.

Figure 2:
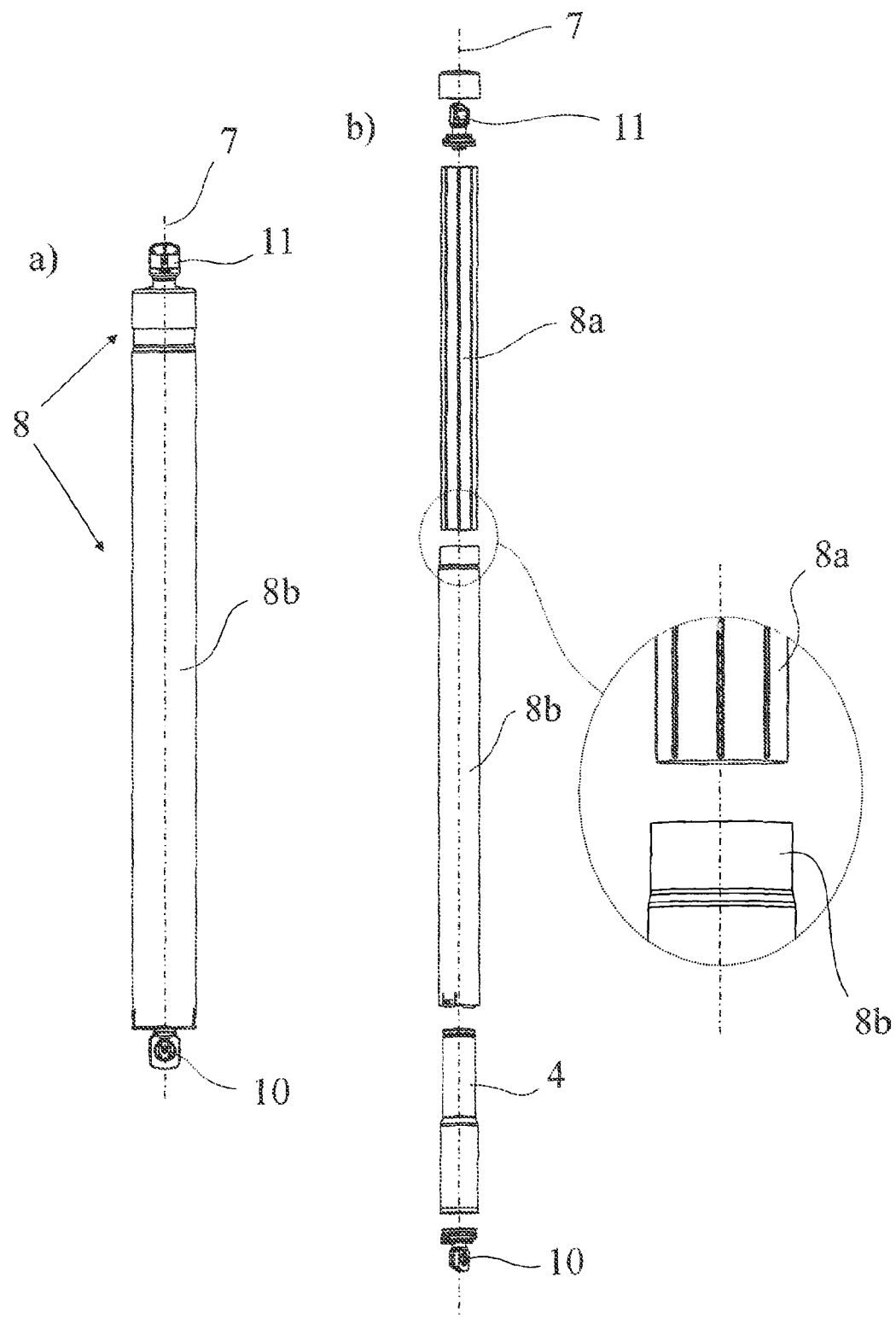
FIG. 2 shows the spindle drive according to FIG. 1 in an outer view (View A)) and in a partial exploded view (View E))

A particular lean configuration is produced in that drive unit 2 and spindle-spindle nut transmission 3 are arranged behind one another on geometrical spindle axis 7. Here, a tubular spindle drive housing 8 is correspondingly provided with a tubular inner housing 8a and a tubular outer housing 8b, wherein inner housing 8a runs in a telescope-like manner in outer housing 8b. A combined view of FIGS. 2 and 3 shows that inner housing 8a here is pushed into outer housing 8b.

Figure 3:
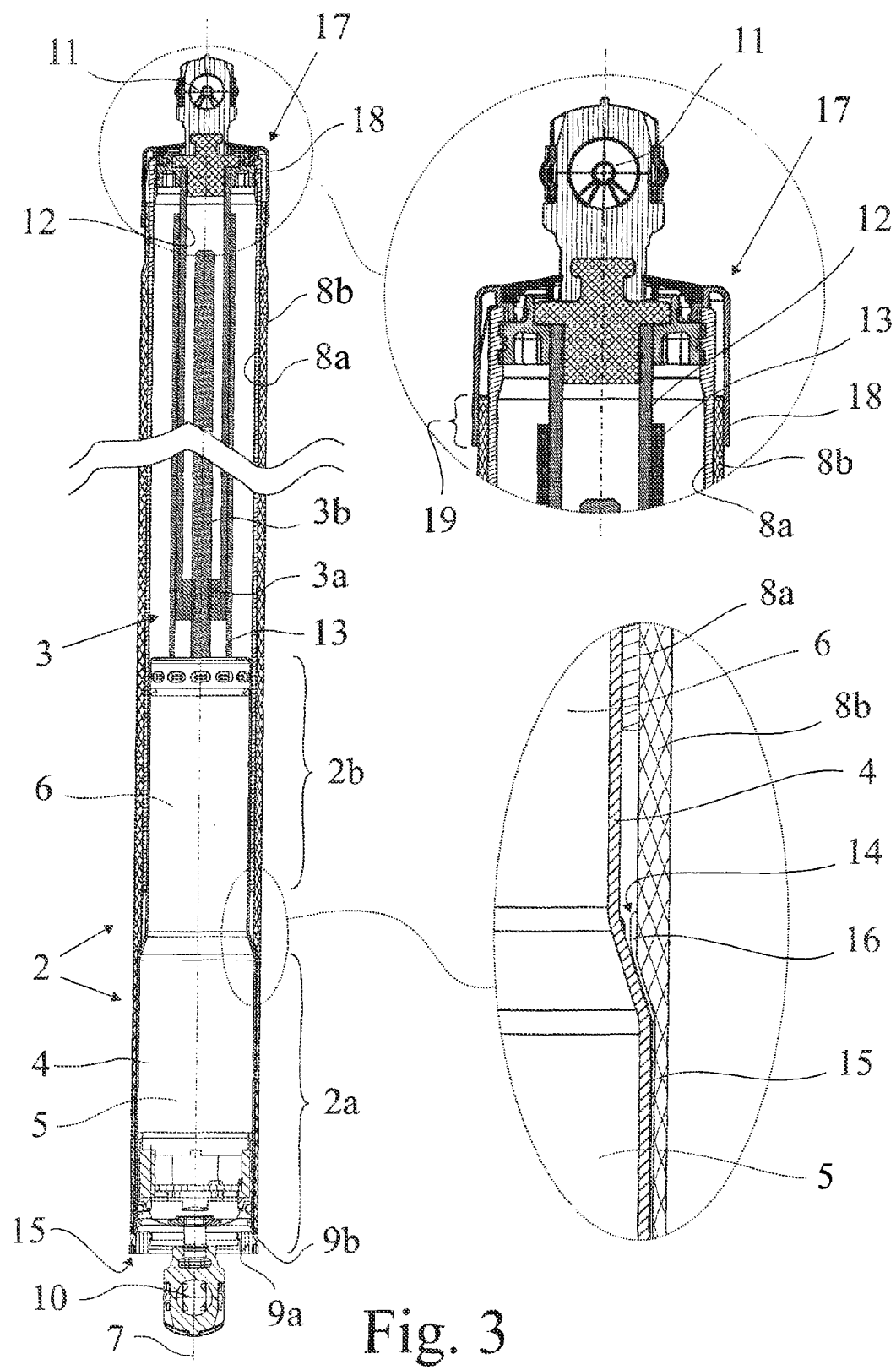
FIG. 3 shows the spindle drive according to FIG. 1 in a longitudinal section and FIG. 4 shows the spindle drive according to FIG. 1 with a detailed view of the outer housing of the spindle drive housing.

FIG. 3 shows that outer housing 8b of spindle drive housing 8 accommodates drive unit 2 with drive unit housing 4 and is connected to drive unit 2. Drive unit 2 has for this purpose an axial connecting portion 2a which is connected to outer housing 8b in a non-positive locking, positive locking or materially engaged manner. In one configuration, the connection between outer housing 8b and drive unit 2 involves a latching connection, with hook-shaped latching elements 9a, which engage in counterlatching elements 9b represented in FIG. 4, here and preferably on drive unit 2.

It should be pointed out that the connection between outer housing 8b and drive unit 2 does not have to be a direct connection. On the contrary, it is conceivable that outer housing 8b is connected to an element which is in turn connected to drive unit 2.

It should furthermore be pointed out at this point that the terms "axial" and "radial" always relate to geometrical spindle axis 7 of spindle-spindle nut transmission 3. Corresponding express indications are omitted below for the purpose of clarity.

The axial extension of drive unit housing 4 is in some cases at least the axial extension of drive motor 5, in this case together with intermediate transmission 6. It can in principle also be the case that drive unit housing 4 is configured to be slightly longer. However, it can be the case that the axial extension of drive unit housing 4 is smaller than 150% of the axial extension of drive motor 5, in this case shown together with intermediate transmission 6. Drive unit 2 is thus to a certain extent configured as a "drive cartridge" which can be configured separately from spindle drive housing 8.

FIG. 3 shows that outer housing 8b fully overlaps with drive unit 2 along geometrical spindle axis 7. A visually attractive configuration of outer housing 8b can thus be easily produced. Moreover, connecting portion 2a can be lengthened depending on the application so that a particularly stable connection can be realized between drive unit housing 4 and outer housing 8b.

As one targeted configuration of the spindle drive, the outer housing 8b is primarily composed of a first material and the drive unit housing 4 is primarily composed of a second material which is different from the first material. In this case the second material is harder than the first material, and/or the second material is less flexible than the first material and/or the second material has a higher toughness than the first material.

It can alternatively or additionally be provided that the first material is a plastic material and that the second material is a metallic material. In this case the metallic material is steel. In summary, a solution according to the proposal enables a configuration of drive unit housing 4 and outer housing 8b tailored to the actual force conditions.

In the depicted case, inner housing 8a and/or outer housing 8b always lie outside the flow of force of the drive force. This primarily means that no axial forces which go back to drive unit 2 are conducted via inner housing 8a and/or outer housing 8b. It can additionally also be provided that no torques are conducted around geometrical spindle axis 7 to inner housing 8a and/or outer housing 8b, as is explained further below.

FIG. 3 shows the fully retracted state of the spindle drive in which inner housing 8a overlaps with an axial overlapping portion 2b of drive unit 2. In the fully extended state, inner housing 8a may not overlap with drive unit 2. It is in principle also conceivable that a certain degree of overlap always remains.

The above overlap between inner housing 8a and drive unit 2 is possible due to the fact that an annular gap is provided between drive unit housing 4 and inner housing 8a, into which gap inner housing 8a dips. For this purpose, drive unit housing 4 has, in the region of overlapping portion 2b, a reduced diameter relative to the rest of the drive unit housing. In this example, the intermediate transmission 6 is accommodated in overlapping portion 2b.

A combined view of FIGS. 2 and 3 shows that drive unit housing 4 is, as discussed above, configured to be substantially tubular, wherein the diameter of drive unit housing 4 in overlapping portion 2b is slightly smaller than in connecting portion 2a which has still to be explained.

Two connections 10, 11, which are arranged on geometrical spindle axis 7, are provided for transfer of the linear drive movements in the case of the represented embodiment. In a further configuration, a first connection 10 is connected to drive unit 2, while second connection 11 is connected via a guide tube 12 to spindle nut 3a of spindle-spindle nut transmission 3. Spindle nut 3a cogs in a manner known per se with spindle 3b of spindle-spindle nut transmission 3, which spindle 3b can be driven rotatably on drive unit 2, but axially fixedly mounted and by means of drive motor 5 via intermediate transmission 6. No axial drive forces are conducted via spindle drive housing 8 as a result of this structural design.

The fact is also interesting in the case of the represented embodiment that a torque tube 13 which is fixed on the drive unit is provided and is optionally fastened on drive unit housing 4. A positive lock can thus be provided between spindle nut 3a or guide tube 12 and torque tube 13 such that an anti-twist lock is produced between the two connections 10, 11. As a result, it is ensured that no torques are also conducted around geometrical spindle axis 7 to spindle drive housing 8.

In principle, however, the anti-twist lock between the two connections 10, 11 can also be provided by a positive lock between inner housing 8a and outer housing 8b. Spindle drive housing 8 must then be configured so that it can absorb corresponding torques around geometrical spindle axis 7.

The realization of the engagement between drive unit housing 4 and outer housing 8b has particular importance for the drainage of spindle drive housing 8. In principle, it cannot namely be avoided that condensation water or the like occurs in spindle drive housing 8 which must escape in some way. It is provided for this purpose that axial connecting portion 2a of drive unit housing 4 is in engagement with outer housing 8b via a spacer arrangement 14. Spacer arrangement 14 generates in this case a radial drainage gap 15 between connecting portion 2a and outer housing 8b.

Figure 4:
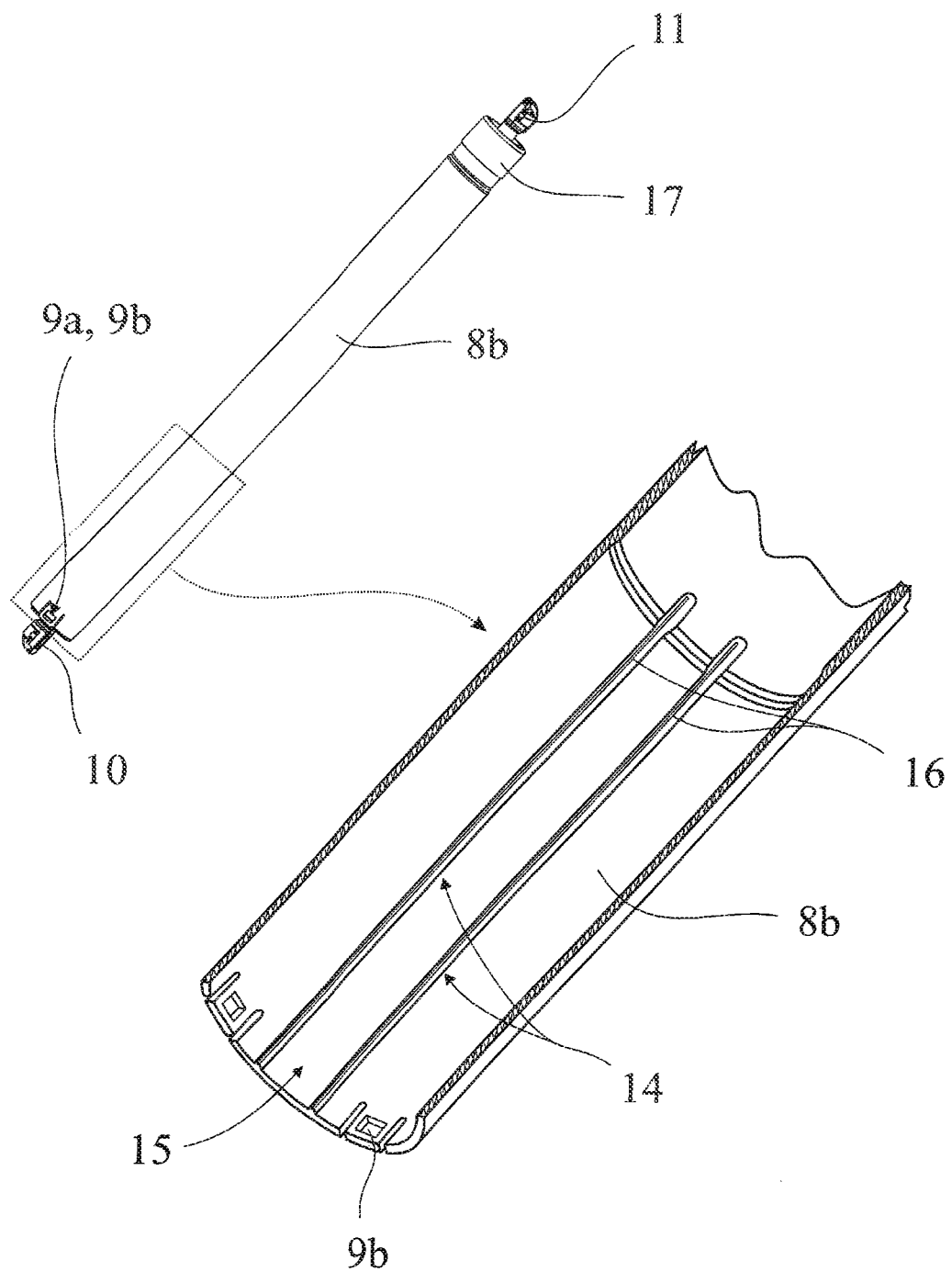

In this example, spacer arrangement 14 is formed from at least one web 16 which furthermore preferably runs substantially axially. Web 16 is, as represented in FIG. 4, preferably arranged on connecting portion 2a of drive unit housing 4. In principle, the at least one web 16 can also, however, be arranged on drive unit housing 4. Due to the fact that the at least one web 16 bears against drive unit housing 4, the width of drainage gap 15 corresponds precisely to the height of the at least one web 16.

A combined view of FIGS. 2 and 3 shows that inner housing 8a has, on its end portion distant from the drive unit, a covering cap 17 which, in the fully retracted state represented in FIG. 3, is in sealing engagement with the end portion, which is distant from the drive unit, of outer housing 8b and, in the extended state, is not in engagement with the end portion, which is distant from the drive unit, of outer housing 8b. In the case of the represented embodiment, covering cap 17 has a circumferential collar 18 which exhibits a certain degree of axial extension. In the case of adjustment of the spindle drive into the fully retracted state, collar 18 is pushed over outer housing 8b so that a certain degree of overlap 19 is generated between collar 18 and outer housing 8b.

Covering cap 17 has a certain degree of elasticity at least in the region in which sealing engagement with outer housing 8b takes place. Covering plate 17 is preferably formed from a rubber-like material in any event in this region.

Covering cap 17 is furthermore in sealing engagement with connection 11, wherein the relevant portion of covering cap 17 is configured in the manner of a rubber sleeve.

A spindle drive with an above covering cap 17, which comes into sealing engagement with outer housing 8b, is the subject matter of a further teaching which has independent significance. According to this further teaching, the essential issue is not the implementation of a drive unit housing 4 in the above sense. Reference can otherwise be made to all the statements above.

A spindle drive with a covering cap 17 described above can above all be used if covering cap 17, in the case of a fully retracted spindle drive, is located in the upper region of the spindle drive so that it must be prevented that fluid runs from above into the region between inner tube 8a and outer tube 8b.

In so far as the end portion, which is distant from the drive unit, of inner housing 8a lies, however, at the bottom in the case of a fully retracted spindle drive, it must be ensured that moisture present in spindle drive housing 8 can reach the outside. It is preferably provided for this that a covering cap, not represented here, provides at least one drainage recess for drainage of inner housing 8a.

Reference should also be made to the fact that the spindle drives according to the proposal can be applied to all types of adjustment elements of a motor vehicle. These include a tailgate discussed above, a trunk lid, an engine hood, a side door, a trunk lid, an elevating roof or the like of a motor vehicle.

According to a further teaching which also has independent significance, a flap arrangement for a motor vehicle with a flap 1 is claimed which is equipped with at least one described spindle drive for motoric adjustment of flap 1.

In principle, the at least one spindle drive of the flap arrangement can be arranged laterally of a flap opening, preferably in a drip rail. It is, however, also conceivable that the spindle drive is arranged transverse to the longitudinal axis of the motor vehicle, in particular in the region of the rear roof frame and acts via deflection elements on the flap or on the body of the motor vehicle.

In another configuration, inner housing 8a is equipped on its end portion distant from the drive unit with a covering cap 17 which, in the case of a fully retracted spindle drive and closed flap 1, lies in the upper region of the spindle drive. It is then preferably the case that covering cap 17 as explained above is in sealing engagement with the end portion, which is distant from the drive unit, of outer housing 8b.

If, however, the covering cap arranged at the end portion, which is distant from the drive unit, of inner housing 8a lies in the lower region of the spindle drive in the case of a fully retracted spindle drive and closed flap 1, it is proposed that the covering cap provides at least one drainage recess for drainage of inner housing 8b, as has also been explained.

In order to explain the flap arrangement according to the proposal in its full scope, reference is otherwise made to the explanations with regard to the spindle drives according to the proposal.

The invention claimed is:

1. A spindle drive for an adjustment element of a motor vehicle, comprising:
   a drive unit and a spindle-spindle nut transmission arranged downstream of the drive unit in terms of drive for generating linear drive movements, wherein the drive unit comprises a tubular drive unit housing and therein a drive motor, wherein the drive unit and the spindle-spindle nut transmission are arranged one behind the other on a geometrical spindle axis; and
   a spindle drive housing with a tubular inner housing and a tubular outer housing, wherein the inner housing runs in a telescopic manner in the outer housing;
   wherein the outer housing of the spindle drive housing accommodates the drive unit with the drive unit housing and is connected to the drive unit; and
   wherein the inner housing has a covering cap on an end portion of the inner housing distant from the drive unit, wherein, in a fully retracted state, the covering cap is in sealing engagement with an end portion of the outer housing distant from the drive unit, and wherein, in an extended state, the covering cap is not in engagement with an end portion of the outer housing.

2. The spindle drive as claimed in claim 1, wherein an axial extension of the drive unit housing is at least the axial extension of the drive motor and is smaller than 150% of the axial extension of the drive motor, together with the intermediate transmission.

3. The spindle drive as claimed in claim 1, wherein the outer housing is primarily composed of a first material and the drive unit housing is primarily composed of a second material, and wherein the second material is harder than the first material, and/or is less flexible than the first material, and/or has a higher toughness than the first material, and/or is a metallic material while the first material is a plastic material.

4. The spindle drive as claimed in claim 1, wherein the inner housing and/or the outer housing always lie outside a flow of a drive force.

5. The spindle drive as claimed in claim 1, wherein the inner housing, in a fully retracted state, overlaps with an axial overlapping portion of the drive unit.

6. The spindle drive as claimed in claim 5, wherein the drive unit housing has, in the region of the overlapping portion, a reduced diameter in comparison with the rest of the drive unit housing.

7. The spindle drive as claimed in claim 1, further comprising two connections for transferring the linear drive movements, wherein a first of the two connections is connected to the drive unit and wherein a second of the two connections is connected via a guide tube to a spindle nut.

8. The spindle drive as claimed in claim 7, wherein an anti-rotation lock is provided between the two connections by a positive lock between the spindle nut or the guide tube and a torque tube fixed on the drive unit, or by a positive lock between the inner housing and the outer housing.

9. The spindle drive as claimed in claim 1, wherein an axial connecting portion of the drive unit housing is in engagement with the outer housing via a spacer arrangement which generates a radial drainage gap between the connecting portion and the outer housing.

10. A spindle drive for an adjustment element of a motor vehicle, comprising:
 a drive unit and a spindle-spindle nut transmission arranged downstream of the drive unit in terms of drive for generating linear drive movements;
 a tubular spindle drive housing with an inner housing and an outer housing, wherein the inner housing runs in a telescopic manner in the outer housing, and wherein the inner housing has a covering cap at an end portion of the inner housing distant from the drive unit;
 wherein when the spindle drive is in a fully retracted state, the covering cap is in sealing engagement with an end portion of the outer housing distant from the drive unit; and
 wherein when the spindle drive is in an extended state, the covering cap is not in engagement with the end portion of the outer housing.

11. A flap arrangement for a motor vehicle, comprising a flap and the spindle drive as claimed in claim 1.

12. The flap arrangement as claimed in claim 11, wherein when the spindle drive is in a fully retracted state and the flap is closed, the covering cap lies in an upper region of the spindle drive.

13. The flap arrangement as claimed in claim 11, wherein when the spindle drive is in a fully retracted state and the flap is closed, the covering cap lies in a lower region of the spindle drive; and
 wherein the covering cap provides at least one drainage recess for drainage of the inner housing.

14. The spindle drive as claimed in claim 1, wherein the tubular drive unit housing is a one-piece housing.

15. The spindle drive as claimed in claim 1, further comprising an intermediate transmission arranged downstream of the drive motor in terms of drive.

16. The spindle drive as claimed in claim 15, wherein an axial extension of the drive unit housing is at least the axial extension of the drive motor together with the intermediate transmission and is smaller than 150% of the axial extension of the drive motor together with the intermediate transmission.

17. The spindle drive as claimed in claim 6, wherein an intermediate transmission is arranged in the overlapping portion.

* * * * *